United States Patent [19]
Johnson

[11] Patent Number: 5,154,139
[45] Date of Patent: Oct. 13, 1992

[54] REFRACTORY TUBE BLOCK
[75] Inventor: Donald K. Johnson, Holden, Mass.
[73] Assignee: Norton Company, Worcester, Mass.
[21] Appl. No.: 522,757
[22] Filed: May 14, 1990
[51] Int. Cl.[5] .............................................. F22B 37/20
[52] U.S. Cl. ................................ 122/235.12; 122/510; 122/512; 165/162
[58] Field of Search ........... 122/512, 511, 510, 235 C, 122/235 A; 165/162

[56] References Cited
U.S. PATENT DOCUMENTS 3,84,254 10/1974 Astrom ........................... 122/235 A
3,838,665 10/1974 Astrom ........................... 122/235 A
3,998,268 12/1976 Sagan ................................. 122/510
4,030,540 6/1977 Roma ................................. 122/510
4,285,396 8/1981 Schwoerer et al. ............... 122/511
4,307,777 12/1981 Chayla .............................. 122/510
4,756,278 7/1988 Fournier .......................... 122/235 A
4,809,645 3/1989 Fournier et al. .................... 110/336

Primary Examiner—Henry C. Yuen
Attorney, Agent, or Firm—Arthur A. Loiselle, Jr.

[57] ABSTRACT

A tube block containing a ribbed surface for prtecting a boiler tube assembly from corrosion is disclosed. The improved design protects the tube assembly while at the same time permitting excellent heat transfer.

7 Claims, 3 Drawing Sheets

REFRACTORY TUBE BLOCK

TECHNICAL FIELD

The present invention is directed to refractory tube blocks useful in protecting boiler tubes from corrosive, erosive and abrasive by-products of a combustion taking place within the boiler, while at the same time maintaining good heat conductivity.

BACKGROUND OF THE INVENTION

The prior art discloses many different types of refractory structures used to protect a variety of structures including hot air ducts, hot water and steam pipes from heat loss. Silicon carbide tube blocks of various configurations are in use to protect fluid carrying tubes in incinerators and circulating fluid bed boilers. As used herein, "boiler" is used generically to refer to all high temperatures boiler assemblies including incinerators, power generating boilers, and the like. Although the prior tube block shapes have relatively high thermoconductivity, ultimate heat flow is not achieved in prior art designs because such tube blocks are not in sufficient direct contact with the metal fluid carrying tubes. In most of these systems, some type of silicon carbide mortar is used between the tubes and the refractory tube block to fill any air gaps and enhance heat flow. However, because of the lower thermal conductivity of these mortars and the thickness of the mortar layer, the heat flow is far below optimum. In other cases, manufacturing variances of the fabricated metal tube walls do not allow the refractory tube blocks to be manufactured with the exacting tolerances required for the intimate fit desired. The resulting air gaps negatively effect the heat flow between the tubes and the tube block assemblies.

Maximum heat flow is critical to boiler efficiency. If the heat transfer between the refractory tube block assembly and the boiler tubes is less than optimum, the outer surface of the tube blocks becomes hotter than designed. As the temperature increases, ash from the fuel being burned will cling to the surface and form an insulating layer. Once this phenomenon begins, the layer gets increasingly thick until heat transfer becomes extremely poor. The "flue gas" above the combustion zone then increases in velocity and temperature, often above the design limits, and causes corrosion/erosion problems downstream in the boiler. In addition, the layer of ash may eventually break off as it grows and cause damage to the base of the boiler.

None of the prior art tube block structures overcome these problems.

DISCLOSURE OF THE INVENTION

The present invention is directed to a tube block design and method of installing such tube blocks which solve the heat flow problems possessed by the prior art structures. This is accomplished by means of a tube block which has protrusions on the surface adjacent to the boiler tube wall. These protrusions are preferably in the form of ribs. When the tube block is placed against the tube walls of fluid-containing (gas or liquid) tubes within a boiler, the ribs are in contact with the tube walls and the grooves between the ribs are filled with a refractory mortar. The tube block also contains a threaded stud which is used to bolt the tube block to the boiler tubes or the membrane between adjoining boiler tubes. This design allows for direct contact of the tube block to the tube walls by means of the ribs, eliminates any air caps by means of the mortar and bolting mechanism, resulting in superior heat flow between the boiler tubes and the tube block as compared with the prior art tube blocks.

DETAILED DESCRIPTION OF THE PREFERRED EMBODIMENT

Figure 1:
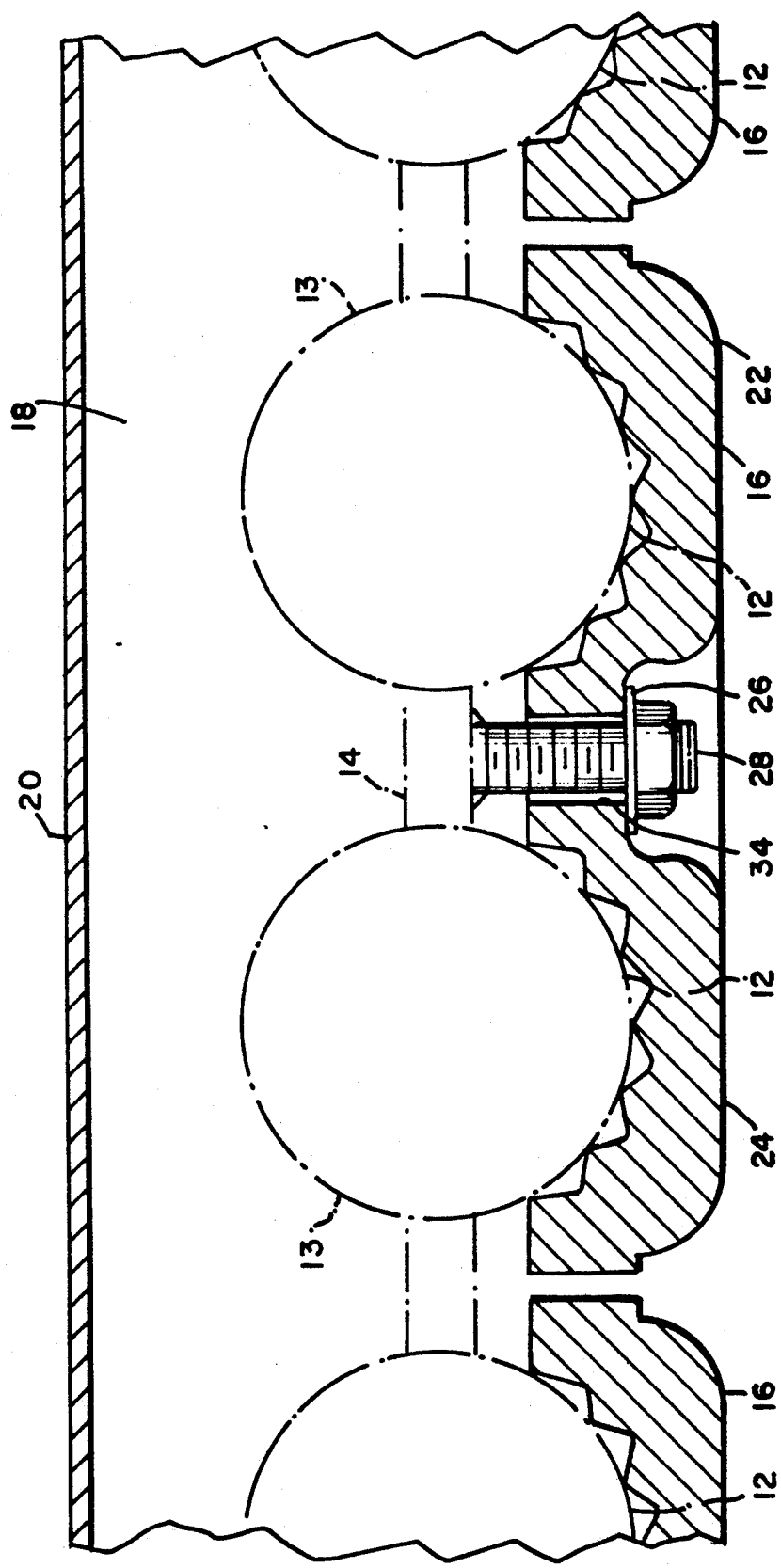
FIG. 1 is a top view of the tube block of the present invention attached to boiler tubes.
Figure 2:
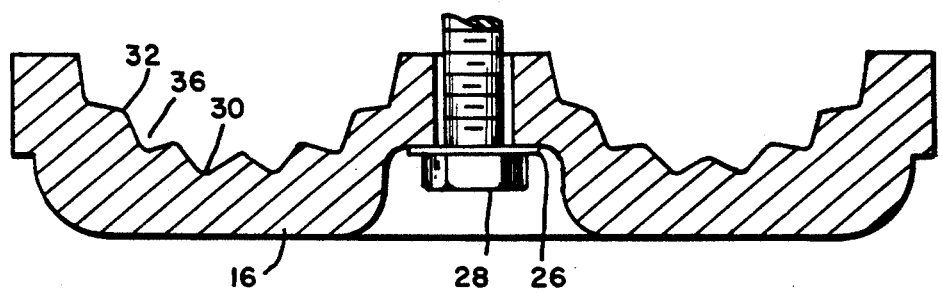
FIG. 2 is a top view of the tube block of the present invention outside of a boiler containing tubes.
Figure 3:
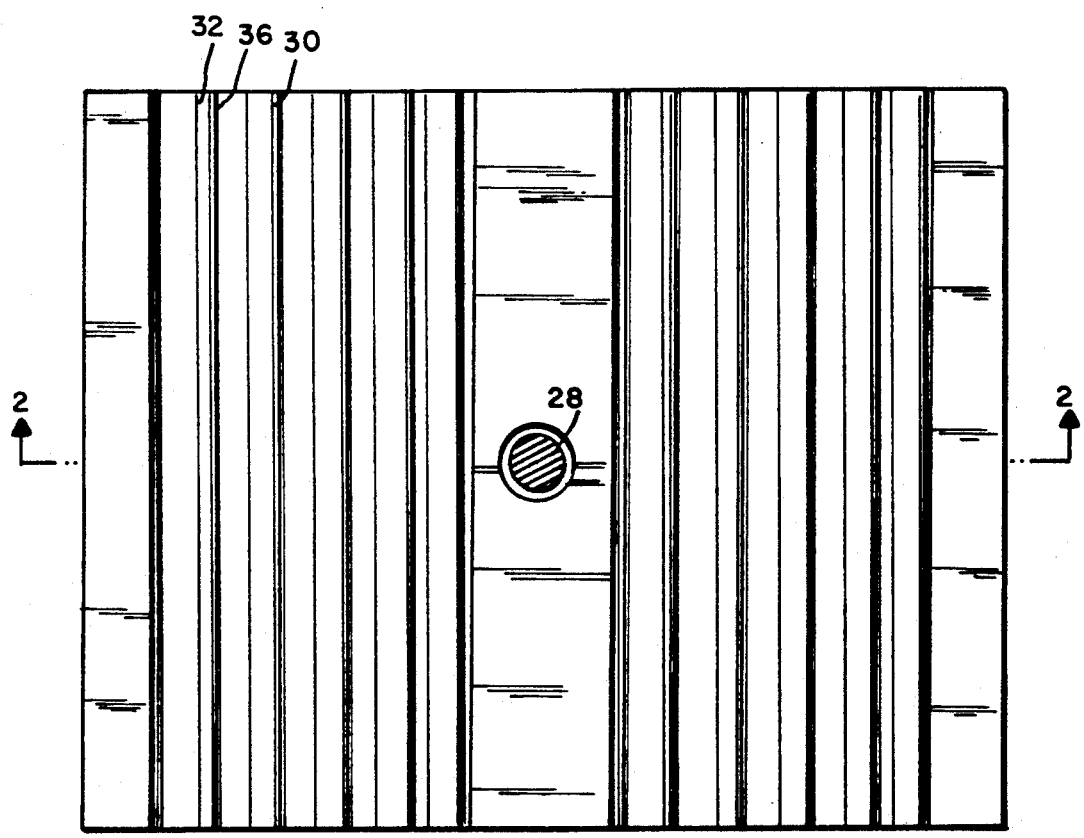
FIG. 3 is a projection of the tube block of FIG. 2 as seen by section 2—2 of FIG. 3.
Figure 4:
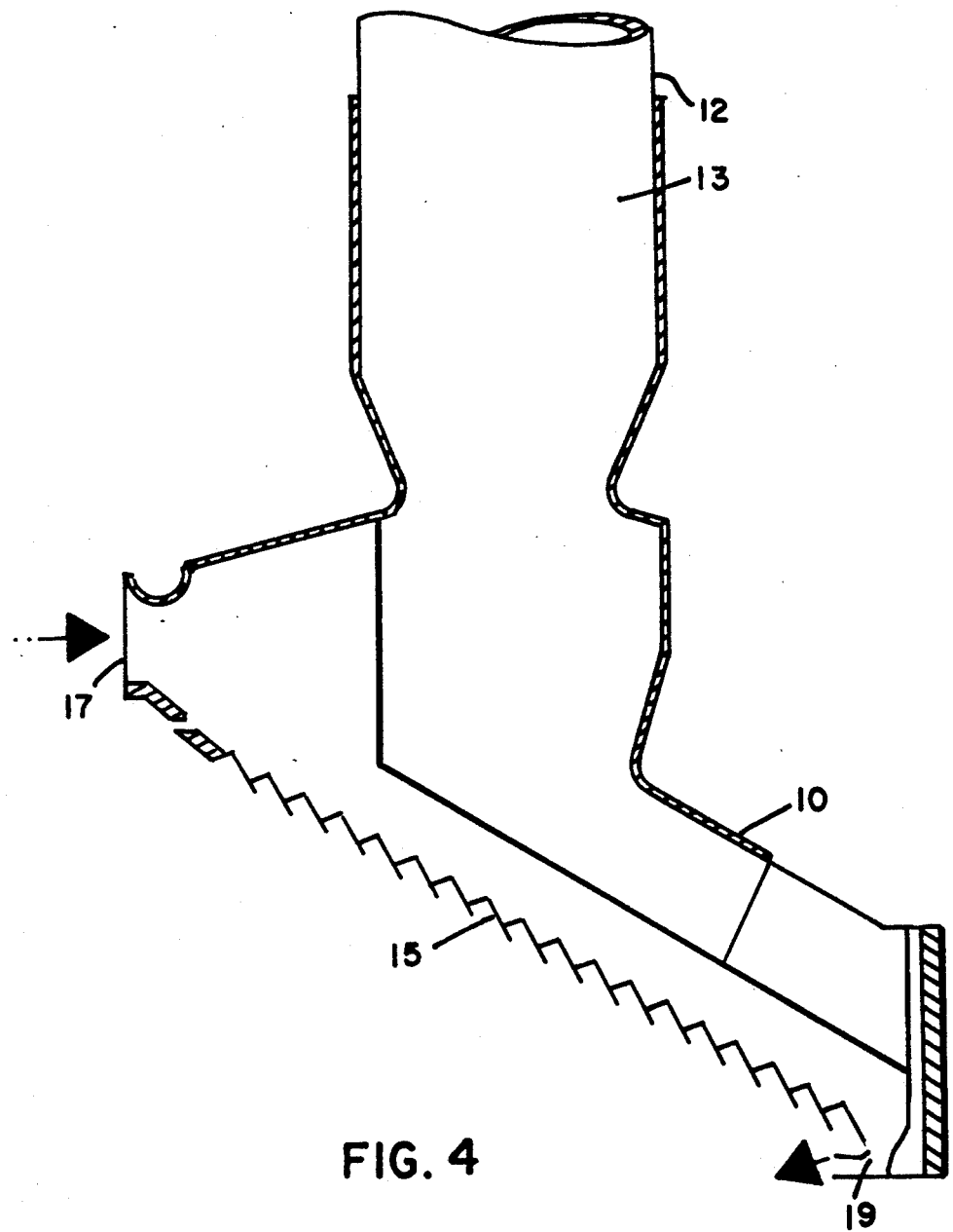
FIG. 4 is a cut-away view of the internal of a boiler containing the tube block of the present invention.

In FIGS. 1 and 4, there is shown a portion of a plurality of tubes 12 forming a tube assembly 13 which extend either vertically or horizontally in the combustion chamber of a boiler 10, such as a high temperature municipal trash and garbage incinerator, such as that shown in FIG. 4. As shown in FIG. 1, the tubes 12 are connected by a membrane 14. The incinerator also contains a feed inlet 17, a grate 15 upon which the burning trash rests, and an ash discharge 19.

In addition to burning trash, the incinerator 10 is utilized to produce a source of energy such as steam to drive a turbine driven electrical generator or to heat fluid for some other purpose. During operation, the incinerator burns trash and garbage at extremely high temperatures of up to about 2500° F. and, as a result, produces corrosive, erosive and abrasive products of combustion which heat and attack the metallic tubes 12 containing a fluid medium, i.e. a gas and/or a liquid.

To prevent direct attack of the tubes by the combustion by-products and yet allow the tubes to be heated, the present invention is directed to refractory tube blocks 16 which surround at least a portion of the tubes 12. In the present embodiment, the backside of the tubes are encased by insulation 18 and sheet metal 20.

As best shown in FIG. 1, each tube block 16 covers the front side of tubes 12 and is composed of two portions 22 and 24 which cover the tubes 12 and a central portion 26 through which a threaded stud and bolt 28 passes. The front surface 30 of the tube block 16 has ribs 32. Although ribs 32 are shown in this embodiment, the surface 30 may instead contain protrusions of any size or shape. While the ribs 32 generally extend either horizontally or vertically across the surface 30 of the tube block, they may be molded in any pattern or design. As shown, the ribs 32 extend a distance "d" away from the surface 30. While the distance d varies according to the size and end use application of the tube block, it is generally of from about 1/16" to ⅛" and more preferably of from about 1/32" to 1/16". The size of the tube block 16 will also vary depending upon the end use application and the tube size of the boiler or incinerator in which it is being used. The individual tube blocks generally have dimensions of from about 6" to 8" width "w", 6" to 8" height "h" and ½" to 1" depth "d". The radius of curvature of the inner surface 30 will depend on the size and radius of the tubes 12 it is designed to fit.

As a result of the extremely high temperatures generated in the boilers and incinerators in which the tube blocks 16 are used, the tube block is preferably manufactured from silicon carbide or metal, although other suitable refractory materials such as alumina, zirconia, and carbon may be employed. In addition to the refractory material per se, the tube blocks will further contain a high thermal conductivity bonding system. A preferred tube block composition contains about 90 to about 99 parts silicon carbide, and about 1 to about 10 parts bonding agent such as a nitride or oxide based material. The tube block is manufactured by conventional techniques and the ribs or other protrusion are molded into the tube blocks as part of the manufacturing process, together with a hole 34 for receiving a means for attaching the tube block to the tube wall, e.g. threaded stud 28 attached to the membrane or tube.

During assembly of the tube block 16 to the tube wall assembly 13 within the boiler, a refractory mortar is applied to the inner surface 30 of the tube block. The refractory mortar may be of any suitable composition and preferably of a composition which provides good heat transfer between the tube block 16 and the tubes 12 of tube assembly 13. Suitable mortar compositions are generally based upon silicon carbide and furthermore contain a bonding agent that will adhere strongly to the tube block and metal tube wall assembly.

As the tube block 16 is placed against the tube assembly 13, it is attached to the tube assembly 13 at the membrane 14 or other suitable place on the tube assembly by means which can bring the tube assembly into intimate contact with the tubes such as a threaded stud. As the threaded stud is tightened the tube block 16 is forced against the tube assembly with the mortar filling the grooves 36 between the ribs 32, thereby eliminating air spaces. The ribs 32 are forced into direct contact with the walls of tubes 12, resulting in excellent heat transfer between the tube assembly 13 and the tube block 16. The mortar also acts to hold the tube block 16 in contact with the tube assembly 13, should the attachment means, i.e. threaded stud and bolt, corrode during prolonged use. Although not required, during assembly the tube block 16 may also be hammered using, for example, a leather faced mallet, against the tube assembly to assure maximum direct contact of the ribs 32 and the elimination of all air gaps.

Although not shown, additional tube blocks can be placed on adjacent portions of the tube assembly. Depending upon the size of the boiler, tube blocks will normally be placed above, below and on both sides of each other to cover the entire tube assembly as required for protection. In a conventional trash incinerator these tube blocks would usually be used to cover all tube wall assemblies subject to deterioration from the products of combustion.

Usually, any gaps between the tube blocks would be left open in incinerator boilers to allow for thermal expansion. However, in fluid bed boiler applications mortar is often used to fill the gaps to prevent abrasion by fluid bed particles.

What is claimed is:

1. A tube block for protecting fluid carrying tubes within a boiler against attack by the products of combustion within the boiler comprising a tube block member having an inner surface and an outer surface, said inner surface being concavely contoured for engaging at least one tube within the boiler, said inner surface having protrusions extending outwardly therefrom for directly contacting at least one tube within the boiler, said tube block member also containing a means for securing the tube block member to at least one tube within the boiler, wherein the tube block is comprised of silicon carbide.

2. A tube for protecting fluid carrying tubes within a boiler against attack by the products of combustion within the boiler comprising a tube block member having an inner surface and an outer surface, said inner surface being concavely contoured for engaging at least one tube within the boiler, said inner surface having protrusions extending outwardly therefrom for directly contacting at least one tube within the boiler, said tube block member also containing a means for securing the tube block member to at least one tube within the boiler, wherein the securing means comprises a threaded stud and bolt.

3. A boiler containing a plurality of fluid-containing tubes so as to form a tube assembly wherein each tube is connected to the adjoining tube by means of a membrane member, a plurality of tube block members attached to portions of the tube assembly, each of said tube block members having an inner surface and an outer surface, said inner surface being concavely contoured so as to engage said fluid-containing tubes, said inner surface having protrusions which directly contact the fluid-containing tubes, said protrusions forming therebetween depressions, said depressions being filled with a refractory based mortar for binding the tube block members to a portion of the tube assembly and a clamping means attached to the tube block members and the tube assembly for securing the tube block members to at least a portion of the tube assembly.

4. The boiler of claim 3, wherein the protrusions are ribs extending across the inner surface of the tube block member.

5. The boiler of claim 3, wherein the tube block member is comprised of silicon carbide.

6. The boiler of claim 3, wherein the clamping means is a threaded stud and bolt extending between the tube block member and the manifold of the tube assembly.

7. The boiler of claim 3, wherein the mortar comprises silicon carbide.

* * * * *